United States Patent [19]

Konishi

[11] 4,138,905

[45] Feb. 13, 1979

[54] DEVICE FOR OPERATING A PARKING BRAKE

[75] Inventor: Hiromu Konishi, Toyota, Japan

[73] Assignee: Toyota Jidosha Kogyo Kabushiki Kaisha, Toyota, Japan

[21] Appl. No.: 800,425

[22] Filed: May 25, 1977

[30] Foreign Application Priority Data

Jan. 25, 1977 [JP] Japan ..................................... 52-6905

[51] Int. Cl.[2] .......................... G05G 1/00; G05G 3/00

[52] U.S. Cl. ................................ 74/577 R; 74/501 R; 74/535; 74/538; 188/82.3

[58] Field of Search ..................................... 188/82–83; 74/501 R, 577 R, 576, 577 M, 577 S, 575

[56] References Cited

U.S. PATENT DOCUMENTS

| | | | |
|---|---|---|---|
| 275,657 | 4/1883 | How | 74/577 M |
| 1,276,625 | 8/1918 | Danielson et al. | 188/82.3 |
| 1,986,227 | 1/1935 | Schomburg et al. | 74/535 |
| 2,294,002 | 8/1942 | Saunders | 74/538 |
| 2,735,311 | 2/1956 | Hinsey | 74/577 X |
| 2,893,262 | 7/1959 | Krause | 74/577 X |
| 2,986,046 | 5/1961 | Vigmostad | 74/576 X |
| 3,216,276 | 11/1965 | Nagy | 74/538 X |
| 3,335,621 | 8/1967 | Buchwald | 74/588 |
| 3,580,104 | 5/1971 | Yashiro | 74/491 X |

FOREIGN PATENT DOCUMENTS

| | | | |
|---|---|---|---|
| 1117312 | 5/1956 | France | 74/538 |

*Primary Examiner*—Leslie Braun

*Attorney, Agent, or Firm*—Stevens, Davis, Miller & Mosher

[57] ABSTRACT

A device for operating a parking brake including a pivotable lever for stretching a brake cable and a one-way locking mechanism for the lever having a pawl and ratchet teeth. The pawl is actuated by the balance of a spring force and the reaction force of the cable stretched so that the pawl is driven into engagement with the ratchet teeth by the reaction of the cable against the spring force when the cable is stretched beyond a predetermined tensioned condition.

6 Claims, 4 Drawing Figures

PARKING BRAKE

DEVICE FOR OPERATING A PARKING BRAKE

BACKGROUND OF THE INVENTION

1. Field of the Invention

The present invention relates to a device for operating a parking brake for vehicles such as automobiles and, more particularly, a device for operating a parking brake of a pivotable lever type.

2. Description of the Prior Art

A device for operating a parking brake of the pivotable lever type generally comprises a lever arranged to be pivotable around a pivot axis and connected with one end of a cable for actuating the parking brake, a ratchet element having ratchet teeth arranged along an arc centered at said pivot axis, a pawl pivotably supported by said lever and adapted to selectively engage said ratchet teeth in a manner to effect a one-way lock of the pivotable movement of said lever, a spring which resiliently drives said pawl into engagement with said ratchet teeth, and a release element for biasing said pawl to be out of engagement with said ratchet teeth, wherein a pivotable movement of the lever causes a stretching of said cable thereby actuating the parking brake. In this conventional device, when the lever is pivotally moved in the brake fastening direction, the pawl moves loosely over the ratchet teeth thereby allowing the lever to move pivotally in said direction, whereas when the lever is going to be pivotally moved in the opposite direction of releasing the brake, the pawl engages one of said ratchet teeth and locks the pivotable movement of said lever.

In the conventional device, therefore, the pawl can engage the ratchet teeth any time when the lever is going to be pivotally moved in the direction of releasing the brake regardless of whether or not the lever is pivotally moved to a position for applying a sufficient tensile force to the cable for ensuring the operation of the parking brake. Consequently, the operator of the parking brake, i.e., the driver, is required to judge whether the parking brake has been effectively engaged or not by a feeling in the operation of the lever, or, in other words, the intensity of the reaction force exerted by the cable to the lever. Because of this inconvenience it sometimes happens that the parking brake is not sufficiently engaged, thereby causing an accident. In fact, such an accident due to loose engagement of the parking brake often happens on a relatively moderate slope. Furthermore, in the conventional device of the above-mentioned structure, since the pawl is constantly urged onto the ratchet teeth by the force of the spring, a clicking noise is generated when the lever is pivotally moved. This clicking noise is often so loud that it can awaken a baby sleeping in the passenger compartment. Therefore, some drivers who dislike the ratchet's clicking noise often operate the parking brake lever while pressing the release button.

In view of the abovementioned inconvenience, it has been proposed to remove the ratchet teeth from a portion corresponding to a small pivotal angle of the lever so that the pawl engages the ratchet teeth only when the lever has been pivotally moved beyond a predetermined pivotal angle. In this structure it is automatically effected that when the lever has been pivotally moved until the pawl engages the ratchet teeth, at least a predetermined tensile force is applied to the brake cable. However, a brake operating device of this type has a drawback in that it requires delicate adjustment and nevertheless is liable to undergo a change in adjustment as time lapses. In other words, a device which was adjusted to engage the parking brake when the lever was pivotally moved to a position where the pawl just engaged one of a few ratchet teeth will soon fail to engage the parking brake even when the lever is pivotally moved to the predetermined position, thereby causing a very serious problem with regard to the safety of the vehicle.

SUMMARY OF THE INVENTION

It is therefore the object of the present invention to obviate the above-mentioned drawbacks in the conventional device for operating a parking brake of the pivotal lever type and to provide an improved device for the same purpose wherein the pawl does not engage the ratchet teeth until the lever is pivotally moved so far that the brake cable is stretched beyond a predetermined tensioned condition regardless of the pivotal angle actually traversed by the lever.

In accordance with the present invention, the above-mentioned object is accomplished by providing a device for operating a parking brake comprising a lever arranged to be pivotable around a pivot axis, a ratchet element having ratchet teeth arranged along an arc centered at said pivot axis, a pawl pivotally supported by said lever and adapted to selectively engage said ratchet teeth in a manner of effecting a one-way lock of the pivotal movement of said lever, a spring which resiliently drives said pawl to be out of engagement with said ratchet teeth, a release element for biasing said pawl to be out of engagement with said ratchet teeth, a cable for actuating the parking brake, said pawl being connected with one end of said cable and adapted to stretch said cable in accordance with a pivotal movement of said lever, while said pawl is pivotally moved toward the engagement with said ratchet teeth by the reaction force applied by said cable so that said pawl engages one of said ratchet teeth when said cable is stretched beyond a predetermined tensioned condition.

BRIEF DESCRIPTION OF THE DRAWING

The present invention will become more fully understood from the detailed description given herein below and the accompanying drawings which are given by way of illustration only, and thus are not limitative of the present invention, and wherein.

DESCRIPTION OF THE PREFERRED EMBODIMENT

Figure 1:
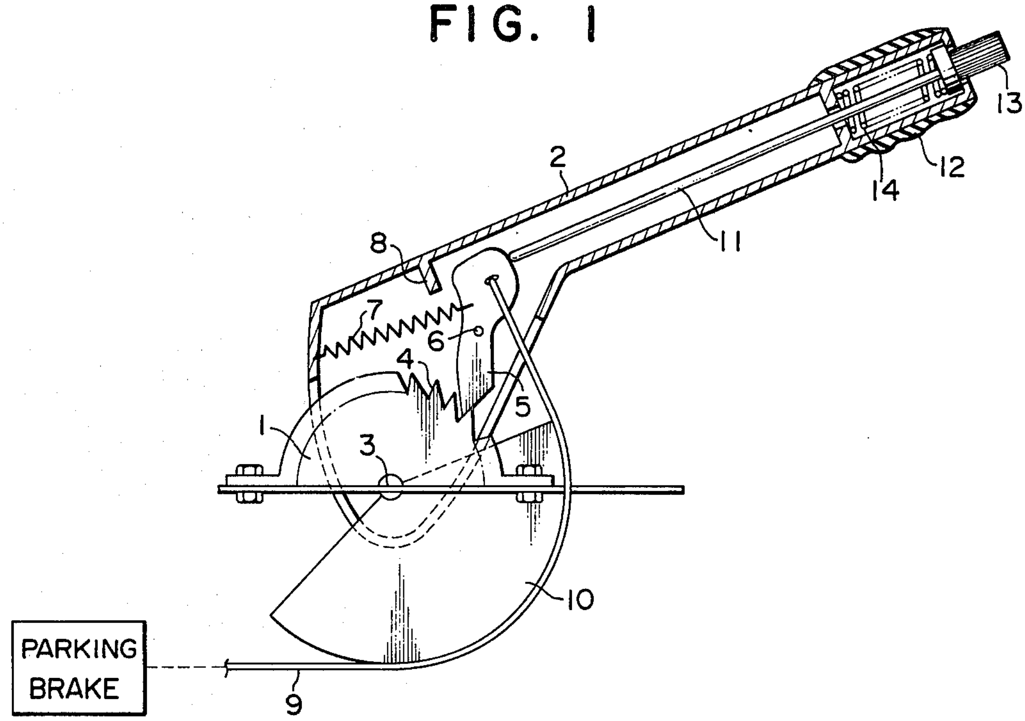
FIG. 1 is a sectional view showing an embodiment of the device for operating a parking brake of the invention, said device being shown in an operating condition wherein the brake cable is stretched beyond a predetermined tensioned condition and the lever is locked against the rotation for releasing the brake.
Figure 2:
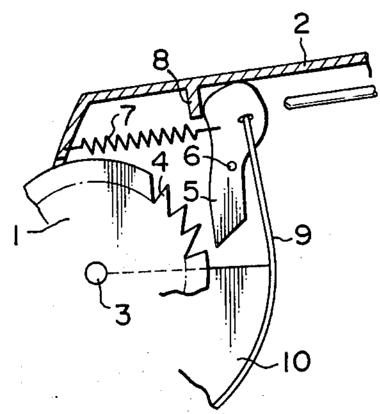
FIG. 2 is a fragmentary view corresponding to an essential portion of the device shown in FIG. 1, wherein the device is shown in a condition where the brake cable is not stretched.

Referring first to FIGS. 1 and 2 showing a first embodiment of the invention, 1 designates a bracket mounted to the body of the vehicle, said bracket supporting a lever 2 in a manner of being pivotable around a pivot shaft 3. The bracket 1 has ratchet teeth 4 arranged along an arc centered at the same pivot axis as the lever 2. A pawl 5 is pivotably mounted to the lever 2 by means of a pivot shaft 6 in a manner such that one end of the pawl selectively engages any one of said ratchet teeth. The pawl 5 is resiliently driven by an expansion coil spring 7 to rotate around a pivot shaft 6 in the anti-clockwise direction as seen in the figure, to be out of engagement with said ratchet teeth until its other end engages a stop 8 formed in the lever. Said other end of the pawl 5 is connected with one end of a brake cable 9 which is arranged along the peripheral portion of a sectoral cam element 10 provided so as to be pivotable around the pivot shaft 3. In this arrangement the cable 9 is stretched to engage the parking brake when the lever 2 is pivotally moved around the pivot shaft 3 in the anti-clockwise direction in the figure, while the cable is loosened to disengage the parking brake when the lever is pivotally moved in the opposite or clockwise direction.

The lever 2 is formed as a hollow member and carries therein a release rod 11 extending along the lever. The rod 11 has one end engaging the aforementioned other end of the pawl 5 and another end connected with a push button 13 mounted to project outward from the tip end of the grip 12 mounted at the tip end portion of the lever 2. The push button 13 is resiliently driven by a compression coil spring 14 to project outward from the tip end of the grip 12.

The device shown in FIGS. 1 and 2 operates as follows:

When the lever 2 is returned to the non-operating position such as shown in FIG. 2, the cable 9 is loosened thereby allowing the pawl 5 to rotate around the pivot shaft 6 in the anti-clockwise direction until the top end of the pawl engages the stop 8 with the lower edged end of the pawl being disengaged from the ratchet teeth 4. Starting from this condition, when the lever 2 is pivotally moved around the pivot shaft 3 in the anticlockwise direction in the figure, the cable 9 is pulled up around the cam element 10 so as to stretch the cable. The tensile force generated in the cable 9 exerts a reaction force on the pawl 5 which drives the pawl to rotate around the pivot shaft 6 in the clockwise direction in the figure, i.e., toward engagement with the ratchet teeth 4, and finally, when the cable is stretched to a predetermined tensioned condition in accordance with the pivotal movement of the lever, the cable reaction force exerted to the pawl 5 overcomes the force of the expansion coil spring 7 and rotates the pawl into engagement with the ratchet teeth as shown in FIG. 1. Thus, the lever is now locked in the shown operating position and maintains the cable 9 in the stretched condition. Therefore, when the spring constant and the pre-loading of the expansion coil spring 7 are judiciously selected, the lever locking mechanism provided by the ratchet teeth and the pawl is actuated only when the brake cable is stretched beyond a predetermined tensioned condition. Therefore, if the lever is pulled and locked at the pulled position, it is automatically guaranteed that it is pulled to a correct position to ensure the positive actuation of the parking brake. By this arrangement, the driver is positively informed whether or not the lever of the parking brake has been correctly operated and accidents due to insufficient engagement of the parking brake are positively avoided. Furthermore, since the pawl is out of engagement with the ratchet teeth until the lever is pulled to the final clamp position, the clinking noise caused by the conventional pawl and ratchet teeth mechanism is not generated. When the parking brake is to be released starting from the locked condition as shown in FIG. 1, the driver need only grip the grip 12 of the lever, pull it slightly upward, push the button 13 while holding the grip at the slightly pulled up position thereby driving the pawl 5 via the rod 11 so that it is rotated around the pivot shaft 6 in the anti-clockwise direction until it is disengaged from the ratchet teeth 4, and return the lever to the release position as shown in FIG. 2.

Figure 3:
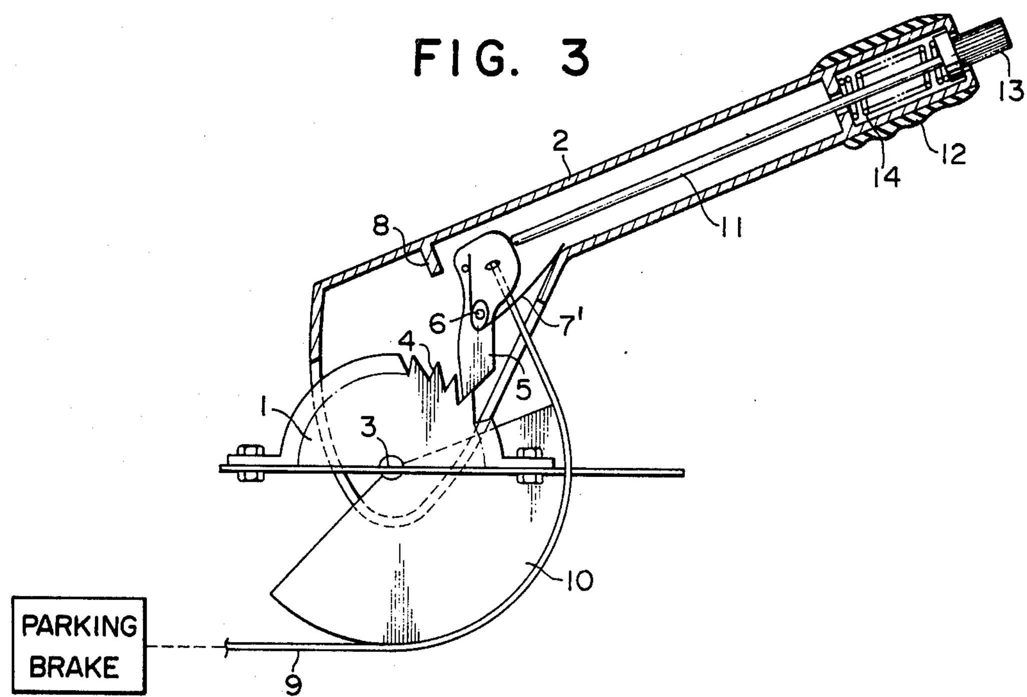
FIGS. 3 and 4 are views similar to FIGS. 1 and 2 respectively, showing another embodiment of the present invention.
Figure 4:
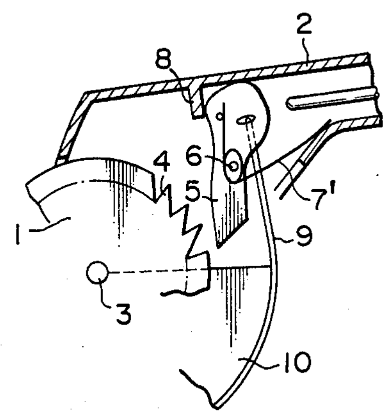

FIGS. 3 and 4 are views similar to FIGS. 1 and 2 respectively, showing a modification of the structure shown in FIGS. 1 and 2. In this modification the expansion coil spring 7 is replaced by a clip spring 7'.

Although the invention has been shown and described with respect to some preferred embodiments thereof, it should be understood by those skilled in the art that various changes and omissions of the form and detail thereof may be made therein without departing from the scope of the invention.

I claim:

1. A device for operating a parking brake comprising a lever arranged to be pivotable around a pivot axis, a ratchet element having ratchet teeth arranged along an arc centered at said pivot axis, a pawl pivotably supported by said lever and adapted to selectively engage said ratchet teeth so as to effect a one-way lock of the pivotal movement of the said lever, a spring resiliently biasing said pawl to be out of engagement with said ratchet teeth, a release element for biasing said pawl to be out of engagement with said ratchet teeth, a cable for actuating the parking brake, said pawl having a portion connected with one end of said cable and adapted to stretch said cable in accordance with a pivotal movement of said lever, said portion being spaced from the pivot axis of said pawl so that said pawl is pivotally moved toward engagement with said ratchet teeth by the reaction force applied by said cable so that said pawl engages at least one of said ratchet teeth when said cable is stretched beyond a predetermined tensioned condition.

2. The device of claim 1, wherein said pawl has opposite ends located at opposite sides of its pivot axis, one end having means to engage said ratchet teeth and the other end having said portion connected with said one end of said cable so that said reaction force applied to said pawl by said cable applies a turning moment to said pawl which turns said pawl in a direction such that said one end of said pawl approaches said ratchet teeth.

3. The device of claim 2, wherein said spring is an expansion coil spring which engages said other end of said pawl and applies a turning moment to said pawl which is contrary with regard to its actuating direction to the turning moment applied by said reaction force of said cable.

4. The device of claim 2, wherein said spring is a clip spring wound around the pivot axis of said pawl and having one end engaged with the body of said lever and the other end engaged with said pawl in a manner such that it applies a turning moment to said pawl which is contrary with regard to its actuating direction to the turning moment applied by the reaction force of said cable.

5. The device of claim 2, wherein a stop is provided for said pawl, said stop limiting the pivotal movement of said pawl in the direction caused by said spring within a limit in which the turning moment caused by the reaction force of said cable does not change its direction.

6. A device for operating a hand brake for an automobile comprising:
  a ratchet element having teeth arranged in an arc about a pivot center;
  a lever mounted for pivotal movement adjacent said ratchet element, said lever carrying a pivot means;
  a pawl pivotally mounted from a pivot point to said pivot means, said pawl having ratchet engaging means on one side of said pivot point and parking brake cable engaging means on the other side of said pivot point so that pivotal movement of said lever will stretch the cable and cause the pawl to pivot and the ratchet engaging means to engage the ratchet teeth, thus holding the lever in its pivoted position;
means to release said pawl from said ratchet teeth.

* * * * *